United States Patent [19]
Dillen

[11] Patent Number: 5,859,892
[45] Date of Patent: Jan. 12, 1999

[54] X-RAY EXAMINATION APPARATUS INCLUDING A SUBTRACTION UNIT

[75] Inventor: Bartholomeus G. M. H. Dillen, Eindhoven, Netherlands

[73] Assignee: U.S. Philips Corporation, New York, N.Y.

[21] Appl. No.: 770,023

[22] Filed: Dec. 19, 1996

[30] Foreign Application Priority Data

Dec. 22, 1995 [EP] European Pat. Off. ............. 95203625

[51] Int. Cl.⁶ ..................................................... H04N 5/00
[52] U.S. Cl. ..................................... 378/98.12; 378/98.8
[58] Field of Search ............................. 378/98.11, 98.12, 378/98.3, 98.8

[56] References Cited

U.S. PATENT DOCUMENTS

| | | | |
|---|---|---|---|
| 4,355,331 | 10/1982 | Georges et al. | 358/111 |
| 4,544,949 | 10/1985 | Kurihara | 378/98.12 |
| 4,549,209 | 10/1985 | Grady et al. | 378/98.12 X |
| 4,675,731 | 6/1987 | Takasu et al. | 378/98.12 X |
| 4,722,097 | 1/1988 | Haendle | 378/99 |
| 5,436,952 | 7/1995 | Haendle et al. | 378/98.12 X |
| 5,602,896 | 2/1997 | Diepstraten | 378/98.12 X |

FOREIGN PATENT DOCUMENTS

0135414A1  3/1985  France .

*Primary Examiner*—David P. Porta
*Attorney, Agent, or Firm*—Dwight H. Renfrew, Jr.

[57] ABSTRACT

An X-ray examination apparatus includes an X-ray source (1) for irradiating an object (2) by means of an X-ray beam (3) in order to form an X-ray image. An optical image is derived from the X-ray image by means of an X-ray detector (4). The optical image is picked up by means of an image pick-up apparatus (5). The image pick-up apparatus (5) includes a plurality of image sensors (6, 7) for deriving separate electronic sub-image signals from the optical image. The image pick-up apparatus also includes a subtraction unit (8) for subtracting the electronic sub-image signals from one another. The image pick-up apparatus (5) also includes a control circuit (9) which is arranged to make integration periods of individual image sensors (7, 8) commence at instants which are spaced a waiting period apart. The difference signal represents changes in the X-ray image or, when the X-ray energy is changed during the waiting period, differences in X-ray absorption due to energy-dependency.

20 Claims, 2 Drawing Sheets

X-RAY EXAMINATION APPARATUS INCLUDING A SUBTRACTION UNIT

BACKGROUND OF THE INVENTION

1. Field of the Invention

The invention relates to an X-ray examination apparatus, including an X-ray detector for deriving an optical image from an X-ray image, an image pick-up apparatus for picking up the optical image, which image pick-up apparatus includes a plurality of image sensors for deriving separate electronic sub-image signals from the optical image, and a subtraction unit for deriving a difference signal from the electronic sub-image signals.

2. Description of the Related Art

An X-ray examination apparatus of this kind is known from German Patent DE 11 23 410.

The known X-ray examination apparatus includes two television cameras which simultaneously pick up the optical image. One of the television cameras is set out-of-focus so that it picks up only coarse structures in the optical image. The other television camera is accurately focused so that it accurately picks up coarse structures as well as fine details in the optical image. Each of the television cameras delivers a video signal, one video signal representing the coarse structures and the small details whereas the other video signal represents the coarse structures only. The video signals are subtracted from one another and the resultant difference signal is applied to a monitor. The difference signal thus represents mainly the small details and these details are displayed with high contrast on the monitor. Therefore, the known X-ray examination apparatus is suitable for high-contrast reproduction of image information relating to smalls in the X-ray image. Because the video signals relate to different components of simultaneous image information, the known X-ray examination apparatus is not suitable for forming a difference image representing changes in the optical image. Changes occur, for example when a contrast medium is injected into a patient to be examined.

SUMMARY OF THE INVENTION

An object of the invention is to provide an X-ray examination apparatus which includes an image pick-up apparatus arranged to supply a difference signal representing changes in the image information in the X-ray image.

This object is achieved by means of an X-ray examination apparatus according to the invention which is characterized in that the image pick-up apparatus includes a control circuit which is arranged to make integration periods of individual image sensors commence successively after a waiting period.

The X-ray examination apparatus comprises an X-ray source for emitting an X-ray beam in order to form the X-ray image of an object, e.g. a patient who is to be radiologically examined.

The integration period of an image sensor is the period during which the image sensor is highly sensitive to incident light. During the integration period, the image sensor integrates the optical image; light incident on the image sensor is then converted into electric charges. Individual image sensors derive the electronic sub-image signals from said electric charges. Upon conversion of the X-ray image into the optical image from changes in the X-ray image are transferred to the optical image. If a change occurs in the optical image during the waiting period, the individual image sensors will supply electronic sub-image signals which deviate from one another mainly because of the change in the optical image. Because the integration periods can be accurately adjusted, a difference signal can be formed which represents mainly, or even substantially exclusively, differences occurring in the optical image during the waiting period. The difference signal represents brightness values of a difference image representing differences between the sub-images. The integration periods can also be made partly coincident, so that a comparatively small amount of time is required to generate the electronic sub-image signals. This is because it is not necessary to postpone the extraction of one electronic sub-image signal until the extraction of another electronic sub-image signal has been completed. When both image sensors pick up substantially the same part of the optical image, noise in the difference signal, as caused by X-ray quantum noise, is mainly or even substantially completely eliminated.

A contrast medium can be administered during the waiting period to the patient who is to be examined. In that case the difference signal represents parts of the patient to be examined which are filled with contrast medium and reproduced in the optical image. It is also possible to change the energy and/or the intensity of the X-ray beam during the waiting period. The difference signal then represents differences in X-ray absorption which are due to the dependency of the X-ray absorption on the X-ray energy and/or intensity. The energy of the X-ray beam can also be changed during the waiting period. The difference signal then contains information regarding the differences in X-ray absorption in the patient to be examined because the X-ray absorption is energy-dependent. This information can be used, for example to derive information as regards the local composition of the patient to be examined. For example, the difference signal can be used to derive the bone density of the patient to be examined therefrom. If after administration of the contrast medium the X-ray energy of the X-ray beam is changed, the reproduction of soft tissues in the difference image can also be counteracted. This mitigates the occurrence of disturbances in the difference signal due to motion in the soft tissues between the picking up of the successive sub-images by the individual image sensors.

A preferred embodiment of an X-ray examination apparatus according to the invention is characterized in that the control circuit is arranged to adjust integration periods of individual image sensors to substantially the same duration.

The control circuit is arranged to ensure that the two successively commencing integration periods have substantially the same duration. It is thus achieved that the two image sensors integrate the optical image successively but for periods substantially equally long in time. In this embodiment the difference signal represents mainly differences due to motion in the X-ray image. Differences between the signal levels of the sub-image signals which are due to differences in duration of the integration periods are thus counteracted as well as possible. When the difference signal has a signal level below a predetermined threshold, or rather when the signal level of the difference signal is substantially zero, hardly any or no movement has occurred in the scene reproduced by the X-ray image during the waiting period. In that case it is advantageous to sum the electronic sub-image signals so as to form an electronic image signal having a signal-to-noise ratio which is better than that of the individual electronic sub-image signals.

A further preferred embodiment of an X-ray examination apparatus according to the invention is characterized in that the subtraction unit includes an analog electronic circuit.

Because the difference signal is derived in analog form from the analog electronic sub-image signals, it will not be necessary to use comparatively expensive digital components. Moreover, digitization errors are avoided.

A further preferred embodiment of an X-ray examination apparatus according to the invention is characterized in that at least one of the image sensors is a charge coupled image sensor including an image storage section.

The storage section is used as an image memory for storing the electric charges formed in the image sensor by light incident on the image sensor. The image memory of one image sensor is read only after the other image sensor has finished picking up the image, thus ensuring that the electronic sub-image signals are read substantially simultaneously and applied to the subtraction unit. It is thus achieved that the difference signal accurately represents a change in the X-ray image. Preferably, charge coupled (CCD) sensors are used as image sensors. Use can be made of two or more of such CCD sensors, one or more of which includes an image storage section. CCD sensors also offer the advantage that their integration period can be electronically adjusted. Moreover, CCD sensors require little space and hence enable compact construction of the image pick-up apparatus.

A further preferred embodiment of an X-ray examination apparatus according to the invention is characterized in that the control circuit is arranged to control the beginning of the integration period on the basis of an external signal.

The external signal can be used for exactly selecting the change whereto the difference signal relates. When the X-ray examination apparatus is used for making a medical diagnosis, the external signal preferably contains medical information. Such an external signal can trigger the picking up of the electronic sub-image signals on the basis of, for example the heart-beat of the patient to be examined, or the instant of administration of a contrast medium. The external signal may also correspond to the operation of the X-ray source when the latter operates in a pulsed mode.

When the image pick-up apparatus includes two image sensors, a difference signal can be formed by subtraction of the electronic sub-image signals from the individual image sensors. The image pick-up apparatus can also be provided with more than two image sensors. A difference signal can then be formed by means of more complex combinations of electronic sub-image signals. For example, difference signals can be formed which represent successive differences in the X-ray image. It is subsequently possible to form difference signals which themselves represent differences between such successive differences.

These and other aspects of the invention will be apparent from and elucidated with reference to the embodiments described hereinafter.

DESCRIPTION OF THE PREFERRED EMBODIMENTS

Figure 1:
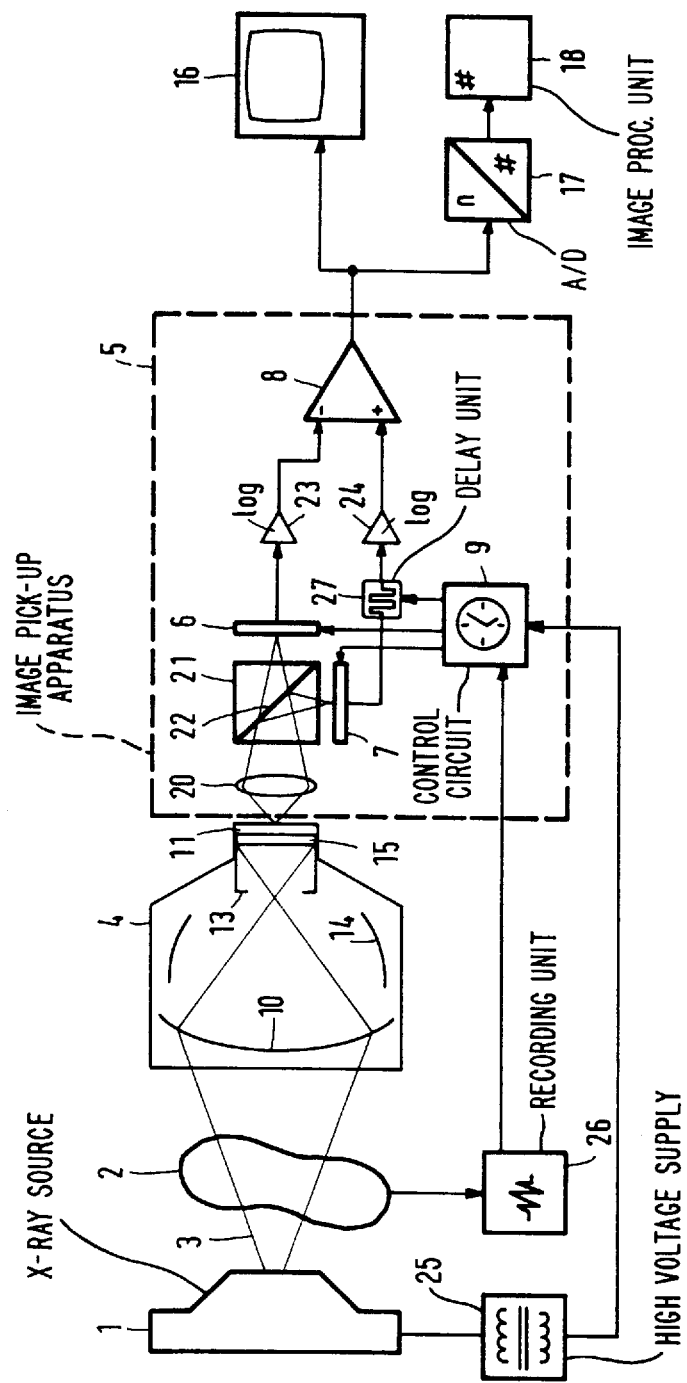
FIG. 1 shows diagrammatically an embodiment of an X-ray examination apparatus in which the invention is used.

FIG. 1 shows diagrammatically an X-ray examination apparatus in which the invention is used. The X-ray source 1 irradiates the object 2, for example a patient to be examined, by means of the X-ray beam 3. Due to local absorption of X-rays within the patient, an X-ray image is formed on an X-ray-sensitive surface 10 of the X-ray detector 4. In the present embodiment the X-ray detector 4 consists of an X-ray image intensifier tube whose entrance screen 10 acts as the X-ray-sensitive surface. The entrance screen 10 converts incident X-rays into an electron beam. The electron beam is emitted by a photocathode which forms part of the entrance screen. The electron beam generates the optical image on a phosphor layer 15 provided on an exit window 11. The X-ray image intensifier comprises an electron-optical system which includes the photocathode, a hollow anode 13 and alignment electrodes 14. The electron optical system images the photocathode on a phosphor layer 15 provided on the exit window. The optical image on the exit window is picked up by means of the image pick-up apparatus 5. The output signal of the image pick-up apparatus can be applied to a monitor 16 on which image information in the X-ray image is reproduced. The output signal can also be digitized by means of an analog-to-digital converter 17 and the digitized signal can be applied to a digital image processing unit 18 for further processing or for making a hard-copy of the image information.

The light emanating from the exit window is focused onto the two image sensors 6 and 7 by a lens 20. The converging light beam formed by the lens 20 is split into two converging sub-beams by means of a beam splitter 21. The beam splitter 21 is, for example a splitting prism having a partly transparent reflection surface 22, but evidently a partly transparent mirror can also be used as a beam splitter. The light incident on each of the image sensors releases charge carriers therein, so that the image sensors convert the incident light into an electronic charge image. The exit window emits, for example visible light but use can also be made of an exit window which emits infrared or ultraviolet radiation. The sensitivity of the image sensors is preferably chosen so as to correspond as well as possible to the wavelengths of the light emanating from the exit window. The electronic charge images are read as primary electronic signals and converted into the electronic image signals by means of respective logarithmic converters 23, 24. This means that a signal level of the electronic sub-image signal amounts to the logarithm of the signal level of the primary image signal. It is thus achieved that the dynamic range of the signal levels of the electronic sub-image signals remains limited. Furthermore, the ratios of signal levels within an electronic sub-image signal are representative of ratios of local X-ray absorptivities within the patient to be examined. The electronic sub-image signals are applied to the inverting input and the non-inverting input, respectively, of a differential amplifier 8. The differential amplifier acts as the subtraction unit in the present embodiment. Such a substraction unit, however, can also be formed by a combination of a sample-and-hold circuit and a 180° phase shifter. The difference signal representing differences between the electronic sub-image signals is then available on the output of the subtraction unit.

The integration periods during which the image sensors have a high sensitivity to the light from the exit window are adjusted by means of the control circuit 9. Use is preferably made of charge coupled (CCD) sensors. Such a CCD sensor is adjusted for image pick-up by applying gate voltages to the sensor elements in the form of MOS diodes in order to switch the MOS diodes to inversion. Details of CCD sensors are given in the book "Solid-State imaging with charge-coupled devices" by Albert J. P. Theuwissen (Kluwer Academic Publishers, the Netherlands, 1995). According to the invention, the control circuit starts the integration periods of the individual image sensors successively after a short waiting period. The difference signal on the output of the subtraction unit then represents a change in the optical image which commences during the waiting period. For example, during the waiting period contrast medium may be administered to the patient. The difference signal then contains mainly image information relating to parts which have become filled with contrast medium, for example blood vessels or the digestive tract. After administration of contrast medium, the integration period of the image sensor having started the image pick-up already before administration of contrast medium may continue, but it may also be terminated. The starting and stopping of the respective integration periods is preferably controlled in conformity with the pulsed emission of X-rays by the X-ray source. To this end, the control circuit 9 is coupled to the high-voltage supply 25 of the X-ray source. It is also possible to control the starting and stopping of the integration periods on the basis of medical information such as, the patient's heart-beat or respiration. This medical information is recorded by means of a recording unit 26. For example, the recording unit 26 records the heart-beat of respiration of the patient to be examined. The control circuit 9 is also coupled to the recording unit 26, for example to ensure that the integration periods always start in corresponding contraction and expansion phases of the heart.

In order to ensure that the electronic sub-image signals are appropriately subtracted, one of the electronic images can be stored in the image storage section of the relevant image sensor for some time, for example until the end of the integration period of the other image sensor. Instead of temporarily storing an electronic image, one of the electronic sub-image signals can be delayed by means of a delay unit 27. The delay of the delay unit 27 is adjusted by means of the control circuit 9. After an image has been stored in the image storage section of the first image sensor during the integration period thereof, the electronic charge image is transferred to the image storage section of the relevant image sensor so as to be read as a primary image signal at a later stage. After a waiting period after the beginning of the integration period of the first image sensor, the control circuit 9 starts the integration period of another image sensor, being the second image sensor in the present example. The integration period of the second image sensor can be started after the electronic charge image has been transferred to the image storage section in the first image sensor; however, it is also possible to make the integration period of the second image sensor commence while the electronic charge image is still being transferred to the image storage section in the first image sensor, or even while the image pick-up in the first sensor is still in progress.

Figure 2:
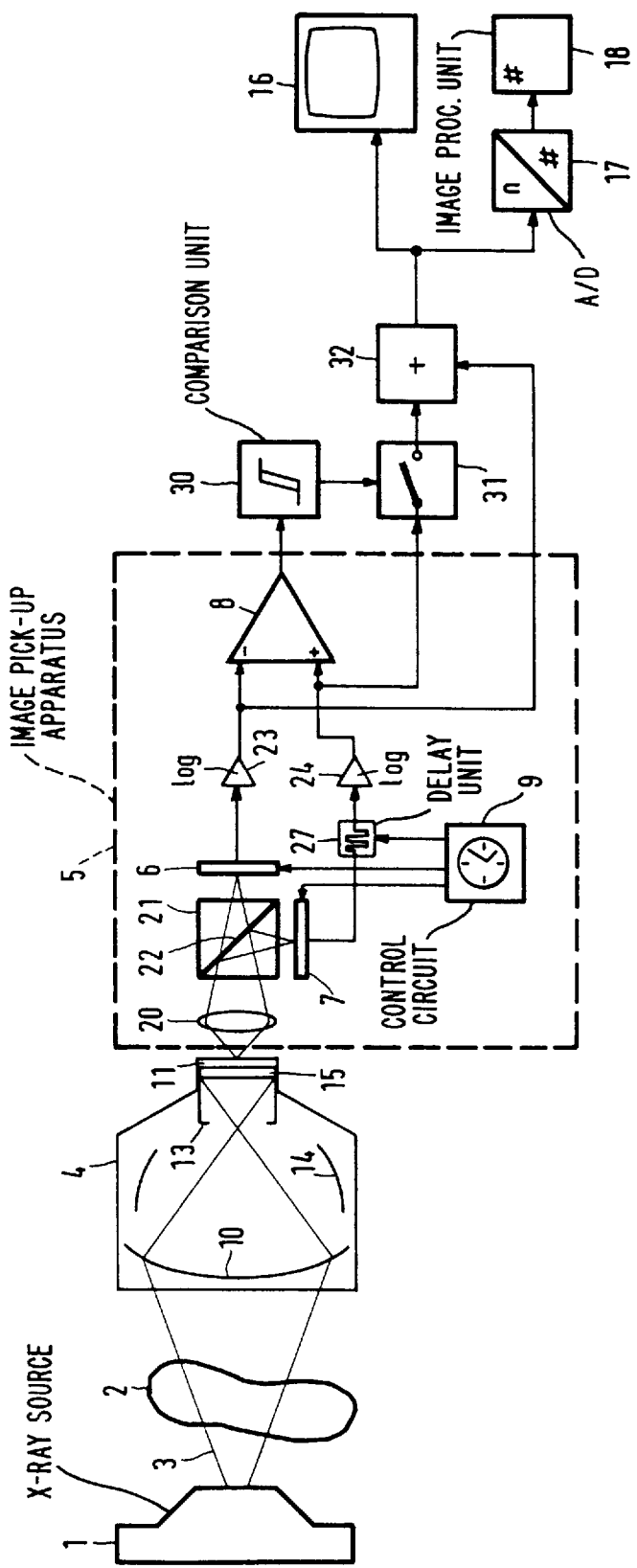
FIG. 2 shows diagrammatically a further embodiment of an X-ray examination apparatus in which the invention is used.

FIG. 2 shows diagrammatically a further embodiment of an X-ray examination apparatus in which the invention is used. In this embodiment the difference signal is used to detect movement in the optical image. The integration periods of the individual sensors are preferably accurately adjusted to the same duration. This accuracy is preferably high enough to ensure that differences between the signal levels of the sub-image signals which do not relate to a change in the optical image do not exceed the noise level of the sub-image signals. The difference signal is applied to a comparison unit 30. If the absolute value of the signal level of the difference signal remains below a predetermined, low threshold value, the comparison unit supplies a switching signal whereby a switch 31 is closed. For example, the mean noise level of the electronic sub-image signals is chosen as the threshold value. The electronic sub-image signal of the logarithmic converter 23 is applied to an adder unit 32. When the switch 31 is closed, the electronic sub-image signal of the logarithmic converter 24 is also applied to the adder unit 32. The output of the adder unit then carries a sum signal having a signal level which amounts to the sum of the signal levels of the electronic sub-image signals. The sum signal contains the image information of the optical image, like the electronic sub-image signals, but with a better signal-to-noise ratio. The sum signal is applied to the monitor 16 in order to reproduce this image information. The sum signal can also be digitized by means of the analog-to-digital converter 17. The digitized sum signal is applied to an image processing unit for further digital processing or for printing in the form of a hard-copy.

I claim:

1. An X-ray examination apparatus, comprising
   an X-ray detector for deriving an optical image from an X-ray image,
   an image pick-up apparatus for picking up the optical image, which image pick-up apparatus includes a plurality of image sensors for deriving separate electronic sub-image signals from the optical image, and
   an electronic subtraction unit for deriving an electronic difference signal from the electronic sub-image signals which are applied electronically to the subtraction unit from the image pick-up apparatus,
   characterized in that the image pick-up apparatus includes a control circuit which is arranged to make integration periods of individual image sensors commence successively after a waiting period.

2. An X-ray examination apparatus as claimed in claim 1, characterized in that the control circuit (9) is arranged to adjust integration periods of individual image sensors (6, 7) to substantially the same duration.

3. An X-ray examination apparatus as claimed in claim 1, characterized in that the subtraction unit (8) includes an analog electronic circuit.

4. An X-ray examination apparatus as claimed in claim 1, characterized in that at least one of the image sensors is a charge coupled image sensor including an image storage section.

5. An X-ray examination apparatus as claimed in claim 1, characterized in that the control circuit is arranged to control the beginning of the integration period on the basis of an external signal.

6. An X-ray examination apparatus as claimed in claim 2, characterized in that the subtraction unit includes an analog electronic circuit.

7. An X-ray examination apparatus as claimed in claim 2, characterized in that at least one of the image sensors is a charge coupled image sensor including an image storage section.

8. An X-ray examination apparatus as claimed in claim 3, characterized in that at least one of the image sensors is a charge coupled image sensor including an image storage section.

9. An X-ray examination apparatus as claimed in claim 6, characterized in that at least one of the image sensors is a charge coupled image sensor including an image storage section.

10. An X-ray examination apparatus as claimed in claim 2, characterized in that the control circuit is arranged to control the beginning of the integration period on the basis of an external signal.

11. An X-ray examination apparatus as claimed in claim 3, characterized in that the control circuit is arranged to control the beginning of the integration period on the basis of an external signal.

12. An X-ray examination apparatus as claimed in claim 6, characterized in that the control circuit is arranged to control the beginning of the integration period on the basis of an external signal.

13. An X-ray examination apparatus as claimed in claim 4, characterized in that the control circuit is arranged to control the beginning of the integration period on the basis of an external signal.

14. An X-ray examination apparatus as claimed in claim 7, characterized in that the control circuit is arranged to control the beginning of the integration period on the basis of an external signal.

15. An X-ray examination apparatus as claimed in claim 8, characterized in that the control circuit is arranged to control the beginning of the integration period on the basis of an external signal.

16. An X-ray examination apparatus as claimed in claim 9, characterized in that the control circuit is arranged to control the beginning of the integration period on the basis of an external signal.

17. The apparatus as claimed in claim 1 further comprising a plurality of logarithmic converters for converting the separate electronic sub-image signals from the image pick-up apparatus and before application to the subtraction unit.

18. The apparatus as claimed in claim 3 further comprising plurality of logarithmic converters for converting the separate electronic sub-image signals from the image pick-up apparatus and before application to the subtraction unit.

19. The apparatus as claimed in claim 1 wherein the control circuit is arranged to control directly the integration periods of the individual image sensors.

20. The apparatus as claimed in claim 1 further comprising one or more delay units for delaying one or more of the separate electronic sub-image signals from the image pick-up apparatus and before application to the subtraction unit.

* * * * *